United States Patent
Nakazawa et al.

(10) Patent No.: US 7,645,192 B2
(45) Date of Patent: Jan. 12, 2010

(54) GAME MACHINE, GAME CONTROL METHOD, PROGRAM, ITS DISTRIBUTING DEVICE, AND INFORMATION STORAGE MEDIUM

(75) Inventors: Kazuhide Nakazawa, Tokyo (JP); Yuki Mizuochi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 559 days.

(21) Appl. No.: 10/528,391

(22) PCT Filed: Mar. 18, 2003

(86) PCT No.: PCT/JP03/03255

§ 371 (c)(1),
(2), (4) Date: Mar. 18, 2005

(87) PCT Pub. No.: WO2004/026424

PCT Pub. Date: Apr. 1, 2004

(65) Prior Publication Data

US 2006/0073898 A1 Apr. 6, 2006

(30) Foreign Application Priority Data

Sep. 19, 2002 (JP) .............................. 2002-273989

(51) Int. Cl.
*A63F 9/24* (2006.01)
*A63F 13/00* (2006.01)
(52) U.S. Cl. ............................................ 463/8; 463/31
(58) Field of Classification Search ........................ None
See application file for complete search history.

(56) References Cited

U.S. PATENT DOCUMENTS 5,051,822 A * 9/1991 Rhoades ....................... 463/25

(Continued)

FOREIGN PATENT DOCUMENTS

EP 0 840 256 A 5/1998

(Continued)

OTHER PUBLICATIONS

Machine translation of JP2000-61142A as obtained from JPO website, 32 pages.*

(Continued)

*Primary Examiner*—M. Sager
(74) *Attorney, Agent, or Firm*—Sughrue Mion, PLLC

(57) ABSTRACT

The present invention provides a game device with which a moving direction and an attack direction of a game character can be easily inputted. The invention provides a game device 10 that executes game processing relating to a game character holding attack means, the game device comprising: a signal input unit 50 for inputting a direction instruction signal and an attack instruction signal; an attack instruction signal input determining unit 52 for determining whether or not the attack instruction signal is inputted by the signal input unit 50; a game character moving unit 54 for moving the game character in virtual space on the basis of the direction instruction signal inputted by the signal input unit 50 while the attack instruction signal is not being inputted by the signal input unit 50; and an attack direction changing unit 56 for changing an attack direction resulting from the attack means on the basis of the direction instruction signal inputted by the signal input unit 50 while the attack instruction signal is being inputted by the signal input unit 50.

7 Claims, 13 Drawing Sheets

U.S. PATENT DOCUMENTS

| | | | | | |
|---|---|---|---|---|---|
| 5,181,107 | A | * | 1/1993 | Rhoades | 725/105 |
| 5,251,909 | A | * | 10/1993 | Reed et al. | 463/29 |
| 5,259,626 | A | * | 11/1993 | Ho | 463/37 |
| 5,317,505 | A | * | 5/1994 | Karabed et al. | 463/37 |
| 5,388,211 | A | * | 2/1995 | Hornbuckle | 717/178 |
| 5,580,308 | A | * | 12/1996 | Nakamura | 463/7 |
| 5,704,837 | A | | 1/1998 | Iwasaki et al. | |
| 5,964,660 | A | * | 10/1999 | James et al. | 463/1 |
| 6,317,125 | B1 | | 11/2001 | Persson | |
| 6,394,906 | B1 | * | 5/2002 | Ogata | 463/38 |
| 6,884,169 | B2 | * | 4/2005 | Tsuchida et al. | 463/31 |
| 2002/0080143 | A1 | | 6/2002 | Morgan et al. | |

FOREIGN PATENT DOCUMENTS

| | | | |
|---|---|---|---|
| GB | 2163929 | * | 5/1986 |
| JP | 9-24161 A | | 1/1997 |
| JP | 2000-061142 A | | 2/2000 |
| JP | 2000-157731 A | | 6/2000 |

OTHER PUBLICATIONS

Jagged Alliance Manual, (c) 1995, 60 pages.*
Jagged Alliance from wikipedia.com, 11 pages.*
Shukan Famitsu The Feb. 6 issue, vol. 13, No. 6, Ascii Corp., Feb. 6, 1998, p. 187.
Segasaturn Gungriffon the Eurasian Conflict Toriatsukai, Setsumeisho, Kabushiki Kaisha Games Arts, 1996, pp. 8 to 9.
Microfilm of the specification and drawings annexed to the request of Japanese Utility Model Application No. 108596/1985 (Laid-open No, 18745/1987), (Ascii Corp.), Feb. 4, 1987.
Microfilm of the specification and drawings annexed to the request of Japanese Utility Model Application No. 122954/1985 (Laid-open No, 31840/1987), (Kabushiki Kaisha SNK Electronics), Feb. 25, 1987.
URL:www.gaming-age.com, no date, 6 pages.
Microsoft "Mechwarrior 4: Vengeance" 'Online! Nov. 23, 2000, Microsoft Game Studios, XP002342537, Retrieved from the Internet: URL:www.gamefaqs.com/computer/doswin/data/913962.html 'retrieved on Aug. 29, 2005', 3 pages.

* cited by examiner

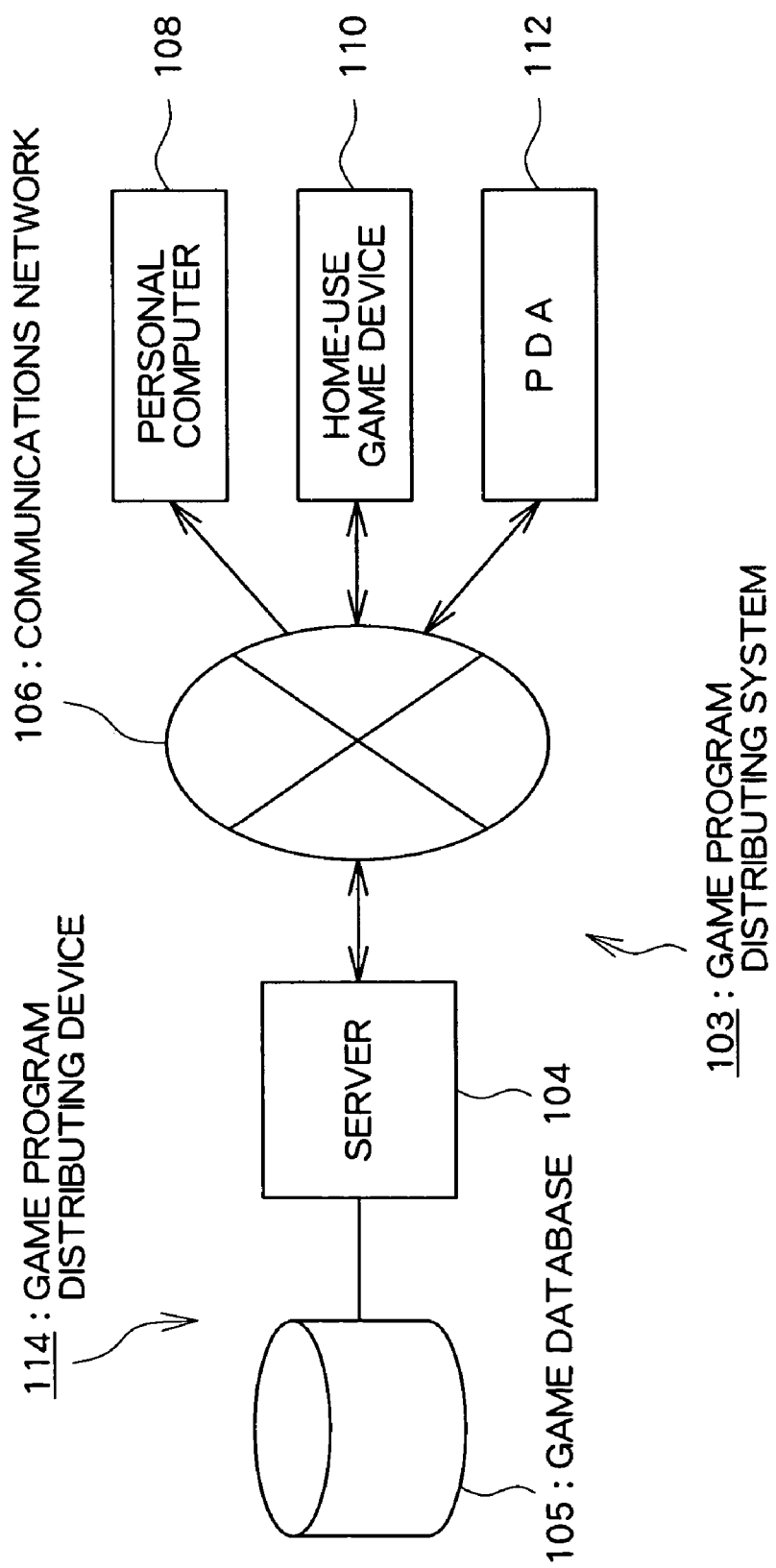

US 7,645,192 B2

GAME MACHINE, GAME CONTROL METHOD, PROGRAM, ITS DISTRIBUTING DEVICE, AND INFORMATION STORAGE MEDIUM

This is a national stage application under 35 U.S.C. § 371 of PCT/JP2003/003255 filed on Mar. 18, 2003, which claims priority from Japanese patent application 2002-273989 filed on Sep. 19, 2002, all of which are incorporated herein by reference.

TECHNICAL FIELD

The present invention relates to a game device, a game control method, a program, a program distributing device and an information storage medium, and in particular to the control of a game where a game character appears holding attack means such as a machine gun.

BACKGROUND ART

With respect to games in which moving bodies such as tanks and airplanes, or people and other game characters, attack an enemy target, it is extremely difficult to distinguish between and precisely maneuver the moving direction and the attack direction of the game character. There have been many conventional games where the attack direction is fixed to the front direction of the game character and the attack direction changes in response to inputting the moving direction of the game character.

However, such games lack a sense of reality because the attack direction is fixed to the front direction of the game character. Thus, there has been a desire to enable the attack direction with respect to the front direction of the game character to be changed with an easy maneuver to improve the sense of reality of the game.

The present invention has been made in light of this problem, and it is an object thereof to provide a game device, a game control method, a program, a program distributing device and an information storage medium with which the moving direction and the attack direction of the game character can be easily inputted.

DISCLOSURE OF THE INVENTION

In order to solve the above problem, a game device pertaining to the present invention is a game device that executes game processing relating to a game character holding attack-means, the game device comprising: signal input means for inputting a direction instruction signal and an attack instruction signal; attack instruction signal input determining means for determining whether or not the attack instruction signal is inputted by the signal input means; game character moving means for moving the game character in virtual space on the basis of the direction instruction signal inputted by the signal input means while the attack instruction signal is not being inputted by the signal input means; and attack direction changing means for changing an attack direction resulting from the attack means on the basis of the direction instruction signal inputted by the signal input means while the attack instruction signal is being inputted by the signal input means.

A game control method pertaining to the present invention is a game control method relating to a game character holding attack means, the game control method comprising: an attack instruction signal determining step of determining whether or not an attack instruction signal is inputted by signal input means; a game character moving step of moving the game character in virtual space on the basis of a direction instruction signal inputted by the signal input means while the attack instruction signal is not being inputted by the signal input means; and an attack direction changing step of changing an attack direction resulting from the attack means on the basis of the direction instruction signal inputted by the signal input means while the attack instruction signal is being inputted by the signal input means.

A program pertaining to the present invention is a program for causing a computer to function as a game device that executes game processing relating to a game character holding attack means, the program causing the computer to function as: attack instruction signal input determining means for determining whether or not an attack instruction signal is inputted by signal input means; game character moving means for moving the game character in virtual space on the basis of a direction instruction signal inputted by the signal input means while the attack instruction signal is not being inputted by the signal input means; and attack direction changing means for changing an attack direction resulting from the attack means on the basis of the direction instruction signal inputted by the signal input means while the attack instruction signal is being inputted by the signal input means.

A program distributing device pertaining to the present invention includes an information storage medium in which is stored the above program, wherein the program is read and delivered by streaming or downloading.

According to the present invention, while the attack instruction signal is not being inputted, the game character moves through the virtual space on the basis of the direction instruction signal, and while the attack instruction signal is being inputted, the attack direction resulting from the attack means changes on the basis of the direction instruction signal. According to the present invention, the position direction and attack direction of the game character can be easily inputted.

In one aspect of the invention, the attack direction changing means changes the attack direction resulting from the attack means on the basis of the direction instruction signal inputted by the signal input means while restricting the movement of the game character based on the direction instruction signal inputted by the signal input means while the attack instruction signal is being inputted by the signal input means. By configuring the invention in this manner, the fact that the role of the direction instruction signal changes between when the attack instruction signal is being inputted and when the attack instruction signal is not being inputted can be clarified.

In one aspect of the invention, the game device further comprises parts data storage means for storage plural parts data representing a posture and relative position from a given origin of each part of the game character, wherein the attack direction changing means includes parts data partial updating means for updating part of the parts data stored in the parts data storage means on the basis of the direction instruction signal inputted by the signal input means while the attack instruction signal is being inputted by the signal input means, with the attack direction changing means determining the attack direction resulting from the attack means on the basis of that part of the parts data stored by the parts data storage means. By configuring the invention in this manner, the game character can change the attack direction while changing the position and/or posture of that part and not changing the position and/or posture of the remaining part.

The game character moving means may include character origin coordinate storage means for storage position coordinates in the virtual space of the character origin set in the game character, with the game character moving means updating the position coordinates storage in the character origin coordinate storage means on the basis of the direction instruction signal inputted by the signal input means while the attack instruction signal is being inputted by the signal input means. Also, the attack means may continuously or intermittently attack an attack target.

BRIEF DESCRIPTION OF THE DRAWINGS

FIG. 13 is a diagram showing the overall configuration of a program distributing system pertaining to another embodiment of the invention.

BEST MODE FOR CARRYING OUT THE INVENTION

Preferred embodiments of the invention will be described in detail below on the basis of the drawings.

Figure 1:
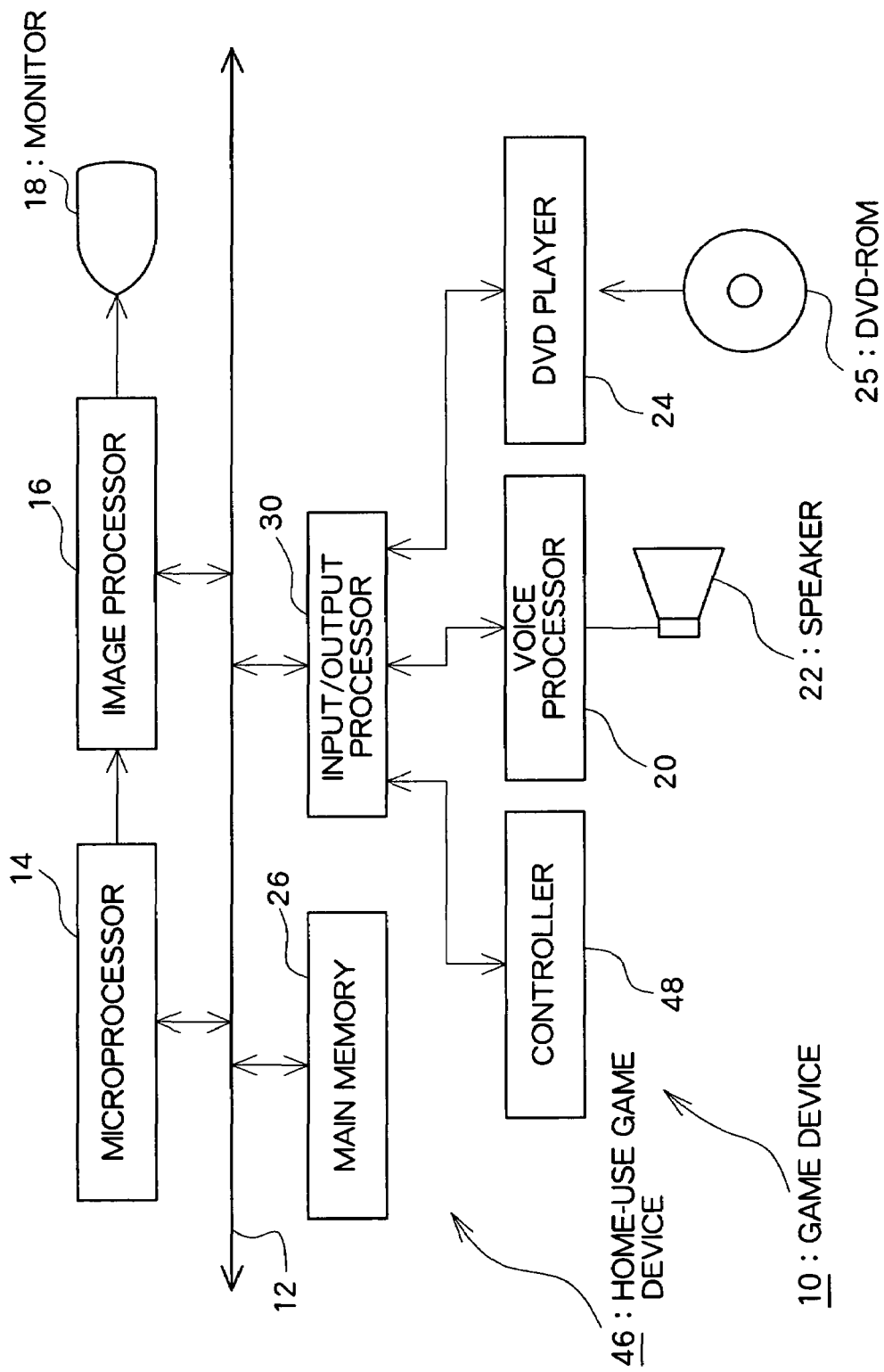
FIG. 1 is a diagram showing the hardware configuration of a game device pertaining to an embodiment of the invention.

FIG. 1 is a diagram showing the hardware configuration of a game device pertaining to an embodiment of the invention. As shown in FIG. 1, a game device 10 is configured by a DVD (trademark)-ROM 25, which is an information storage medium, being loaded in a home-use game device 46 connected to a monitor 18 and a speaker 22. Here, the DVD-ROM 25 is used to supply a game program and game data to the home-use game device 46, but all other information storage media, such as a CD-ROM (trademark) or a ROM card, can be used. The game program and game data can also be supplied from a remote location to the home-use game device 46 via a data communication network such as the Internet.

The home-use game device 46 is a known computer game system that includes a microprocessor 14, an image processor 16, a main memory 26, an input/output processor 30, a voice processor 20 and a DVD-ROM player 24. The microprocessor 14, the image processor 16, the main memory 26 and the input/output processor 30 are interconnected via a bus 12 so that data communication between them is possible. A controller 48, the voice processor 20 and the DVD-ROM player 24 are connected to the input/output processor 30. The constituent elements of the home-use game device 46 are housed within a casing. Here, a home-use television receiver is used as the monitor 18, and an internal speaker is used as the speaker 22.

The microprocessor 14 controls each part of the home-use game device 46 on the basis of an operating system stored in an unillustrated ROM and a game program read from the DVD-ROM 25. The bus 12 is for exchanging addresses and data between each part of the home-use game device 46. The main memory 26 includes a RAM, and the game program and game data read from the DVD-ROM 25 are written as needed in the main memory 26. The main memory 26 is used for the work of the microprocessor 14. The image processor 16 includes a VRAM, receives image data sent from the microprocessor 14, plots a game screen on the same VRAM, converts the content thereof into video signals, and outputs the video signals to the monitor 18.

The input/output processor 30 is an interface for relaying data communication between the controller 48, the voice processor 20, the DVD-ROM player 24 and the microprocessor 14. The voice processor 20 includes a sound buffer, plays data such as music and game sound effects read from the DVD-ROM 25 and stored in the sound buffer, and outputs the music and game sound effects from the speaker 22. The DVD-ROM player 24 reads the game program and game data recorded on the DVD-ROM 25 in accordance with an instruction from the microprocessor 14. The controller 48 is means for inputting operation signals.

Figure 2A:
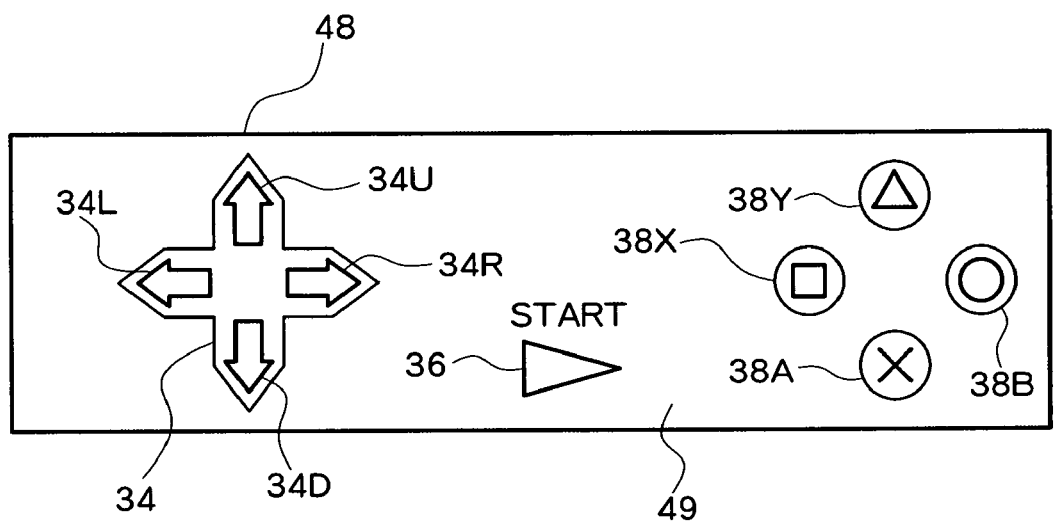
FIGS. 2A and 2B are diagrams showing an example of a controller.
Figure 2B:
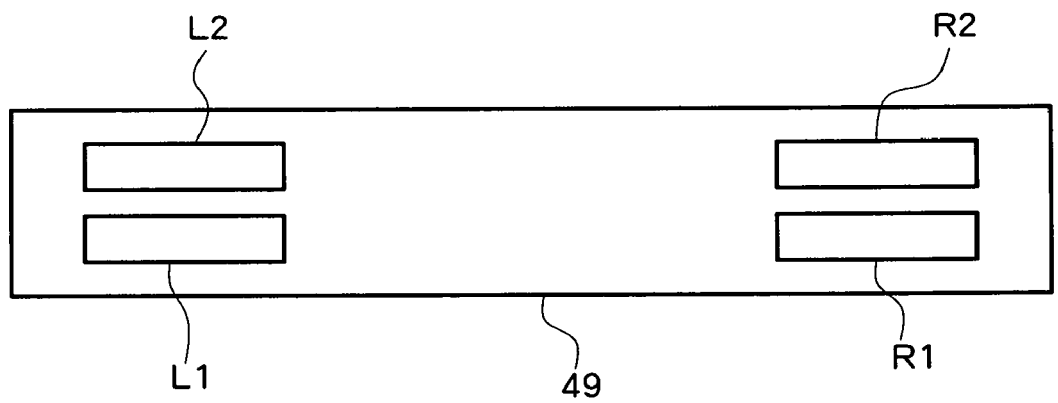

FIG. 2($a$) is a plan diagram showing an example of the controller 48, and FIG. 2($b$) is a rear view thereof. The controller 48 shown in FIGS. 2($a$) and 2($b$) is a general-use game controller. A direction key 34, a start button 36, and buttons 38X, 38Y, 38A and 38B are disposed on an upper surface 49 of the controller 48, and auxiliary buttons L1, L2, R1 and R2 are disposed on side surfaces of the controller 48. The direction key 34 is ordinarily used for instructing the moving direction of a game character and a cursor. On the surface of the direction key 34, an UP direction indicator 34U, a DOWN direction indicator 34D, a RIGHT direction indicator 34R and a LEFT direction indicator 34L are depicted and configured so that a player can determine at a glance the operations that the indicators signify. In the game described below, and particularly with respect to a state where the auxiliary button R2 is depressed, the same direction key 34 is used to instruct a change in an attack direction when the game character is attacking and to instruct a moving direction when the game character is not attacking. The start button 36 is a small push button that has a triangular shape, and is ordinarily used to start the game or forcibly end the game. The buttons 38X, 38Y, 38A and 38B, and the auxiliary buttons L1, L2, R1 and R2, are used for other game operations. In the game described below, the button 38B is used for an attack instruction, and the auxiliary button R2 is used for alert mode instructions.

Below, technology will be described with which a game is realized that can instruct the moving direction of the game character with the direction key 34 and in particular instruct the attack direction during attack in the game device 10 having the above-described hardware configuration.

Figure 3:
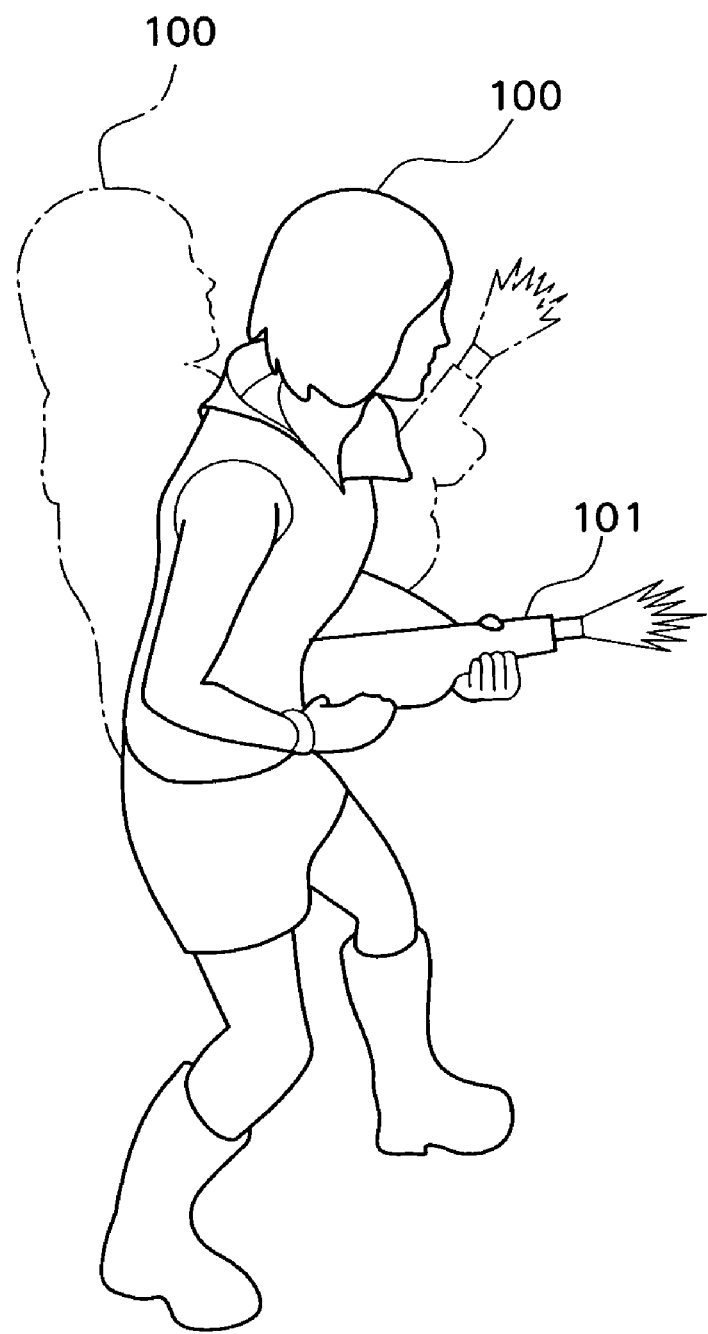
FIG. 3 is a diagram showing a game character shooting a machine gun in a standard posture.

FIG. 3 is a diagram showing a game character displayed on the monitor 18 in the game pertaining to the present embodiment. In the game pertaining to the present embodiment, the operating mode of the game character is set to an alert mode while the auxiliary button R2 is being depressed. FIG. 3 shows the appearance of the game character attacking using a machine gun in the alert mode.

As shown in FIG. 3, a game character (object) 100 holds a machine gun (object) 101 with both hands, and a state where the game character 100 bends their waist, particularly in the alert mode, is a standard posture. These images are generated on the basis of moving object data pertaining to the game character 100 and the machine gun 101 stored in the game device 10. During attack in the alert mode, i.e., in a state where both the auxiliary button R2 and the button 38B are depressed, the game character 100 moves their upper body while the lower half of her body is kept stationary as a result of the direction key 34 being depressed, and the barrel direction (attack direction) of the machine gun 101 changes in response thereto. Namely, by operating the direction key 34 in the UP direction during attack in the alert mode and inputting an UP direction signal to the home-use game device 46, the upper body can be moved up while the lower half of the body is kept stationary. Also, by operating the direction key 34 in the DOWN direction and inputting a DOWN direction signal to the home-use game device 46, the upper body can be bent while the lower half of the body is kept stationary. Also, by operating the direction key 34 in the RIGHT direction and inputting a RIGHT direction signal to the home-use game device 46, the upper body can be turned right while the lower half of the body is kept stationary. Moreover, by operating the direction key 34 in the LEFT direction and inputting a LEFT direction signal to the home-use game device 46, the upper body can be turned left while the lower half of the body is kept stationary.

Figure 4:
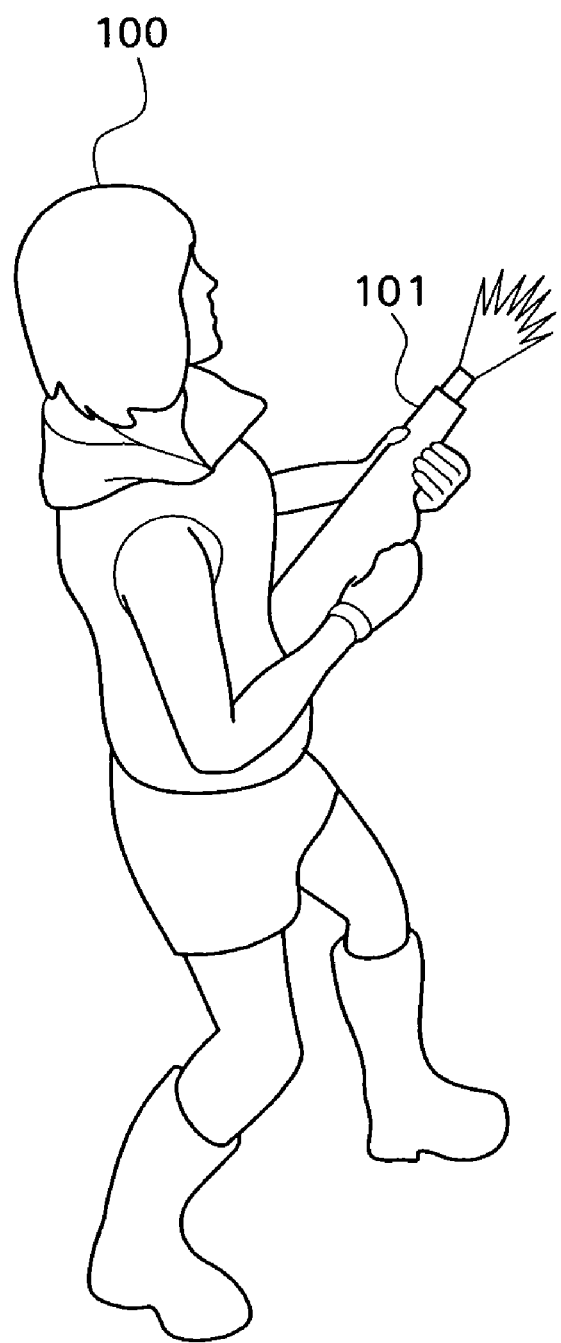
FIG. 4 is a diagram showing the game character raising her upper body and shooting the machine gun.

In FIG. 3, the standard posture in the alert mode is represented by solids lines, and a posture where the upper body is moved up is represented by one-dot chain lines. In FIG. 4, an image of the entire game character 100 whose upper body is moved up is represented. When the upper body is moved in this manner to change the posture of the game character 100, the position and posture of the machine gun 101 change in response thereto. As a result, the attack direction resulting from the machine gun 101 changes. The machine gun 101 is attack means that continuously or intermittently shoots bullets while the button 38B is being depressed. In this game, the above operating system is used, so that the attack direction can be changed during attack, which succeeds in appropriately reproducing an appearance where the game character 100 shoots the machine gun 101.

The specific processing by which the shooting of the machine gun 101 is realized will be described below.

Figure 5:
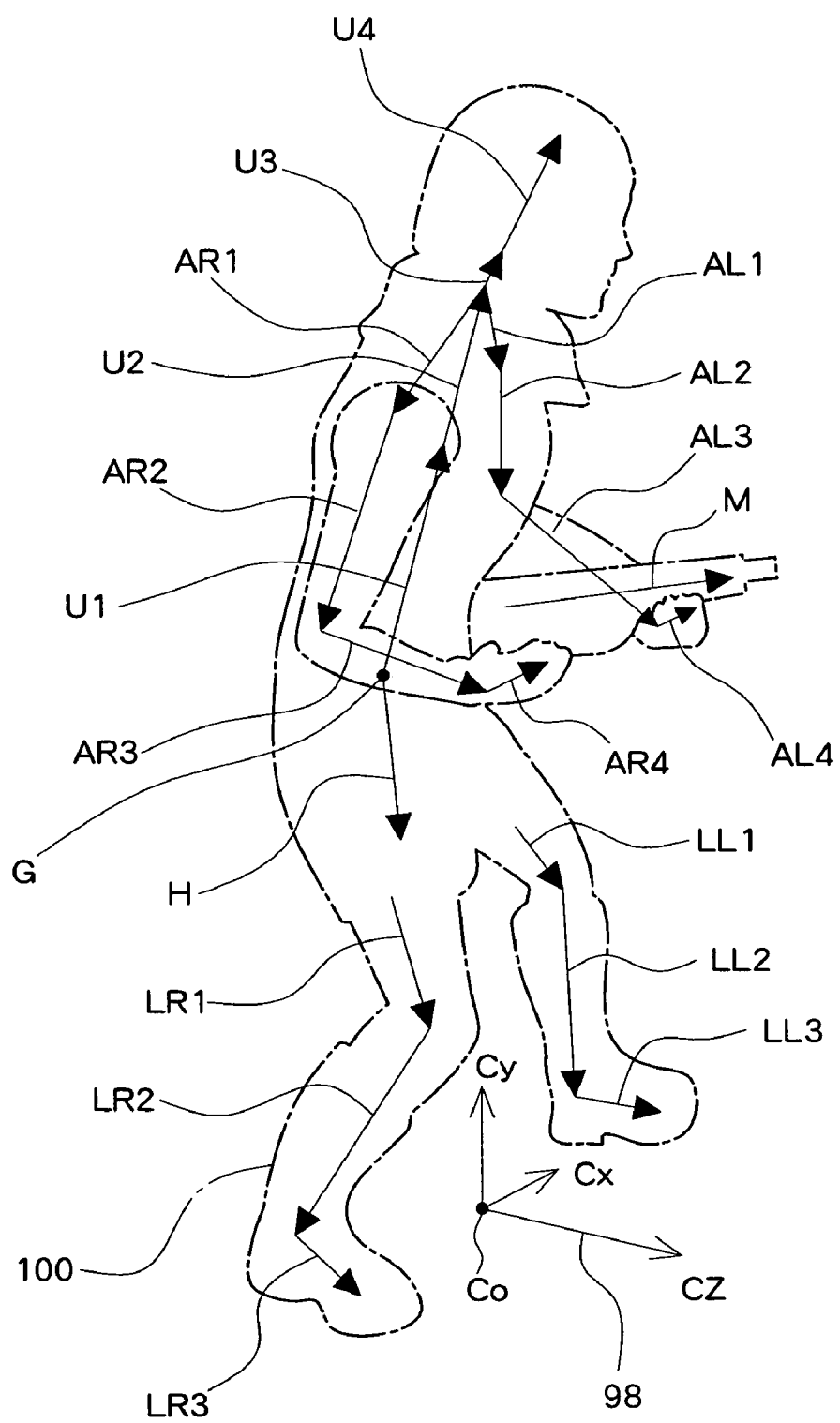
FIG. 5 is a diagram showing a character origin, character coordinates, and bones set in the game character and machine gun.

FIG. 5 is a diagram showing bones set in the game character 100. As shown in FIG. 5, set in the game character 100 are a bone U1 that penetrates the torso portion using a center point G as a starting point; a bone U2 that penetrates the chest portion using the end point of the bone U1 as a starting point; a bone U3 that penetrates the neck portion using the end point of the bone U2 as a starting point; a bone U4 that penetrates the head portion using the end point of the bone U3 as a starting point; and a bone H that penetrates the hip portion using the center point G as a starting point. Also set in the game character 100 are a bone AR1 that reaches the right shoulder using the end point of the bone U2 as a starting point; a bone AR2 that penetrates the right-hand upper arm portion using the end point of the bone AR1 as a starting point; a bone AR3 that penetrates the right-hand forearm portion using the end point of the bone AR2 as a starting point; and a bone AR4 that penetrates the right hand using the end point of the bone AR3 as a starting point. Similarly, set in the game character 100 are a bone AL1 that reaches the left shoulder using the end point of the bone U2 as a starting point; a bone AL2 that penetrates the left-hand upper arm portion using the end point of the bone AL1 as a starting point; a bone AL3 that penetrates the left-hand forearm portion using the end point of the bone AL2 as a starting point; and a bone AL4 that penetrates the left hand using the end point of the bone AL3 as a starting point. Also set in the game character 100 are a bone LR1 in the right leg thigh portion, a bone LR2 in the right leg shin portion, a bone LR3 in the right foot, a bone LL1 in the left leg thigh portion, a bone LL2 in the left leg shin portion, and a bone LL3 in the left foot.

Figure 6:
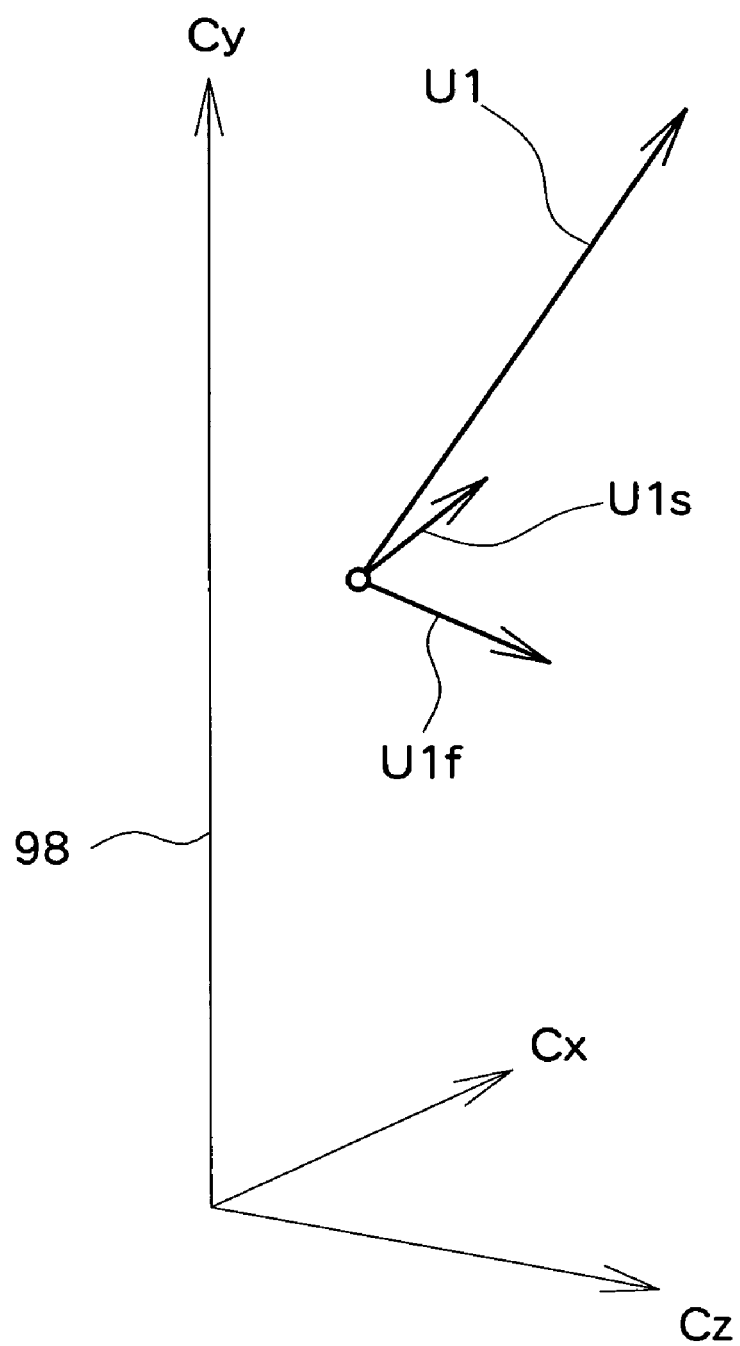
FIG. 6 is a diagram describing the data format of the bones (parts data).

Moreover, in the game character 100, a character origin Co is set in the vicinity of a ground position center of both legs, and a character coordinate system 98, where the front direction of the game character 100 is represented by a Z direction, the left direction is represented by an X direction and the head portion direction is represented by a Y direction, is set. In the game device 10, a starting point position, an end point position, a front direction vector and side direction vectors (all of which are parts data) are stored in regard to each bone. Here, the starting point positions and end point positions are stored as relative position coordinates with respect to the character origin Co. FIG. 6 is a diagram using the bone U1 as an example to show the relationship between the character coordinate system 98, a starting point (white circle), an end point (U1 arrow end), a front direction vector U1f and a side direction vector U1s.

Also, a dependent relationship is set for each bone. When the position and/or posture of one bone is changed, the positions and/or postures of other bones directly dependent on that bone are also changed. In FIG. 5, the dependent relationships of the bones are represented by arrows. Namely, other bones indicated by an arrow added to a certain bone are directly dependent on that bone. For example, a bone M set in the machine gun 101 is dependent on the bone U1.

Figure 7:
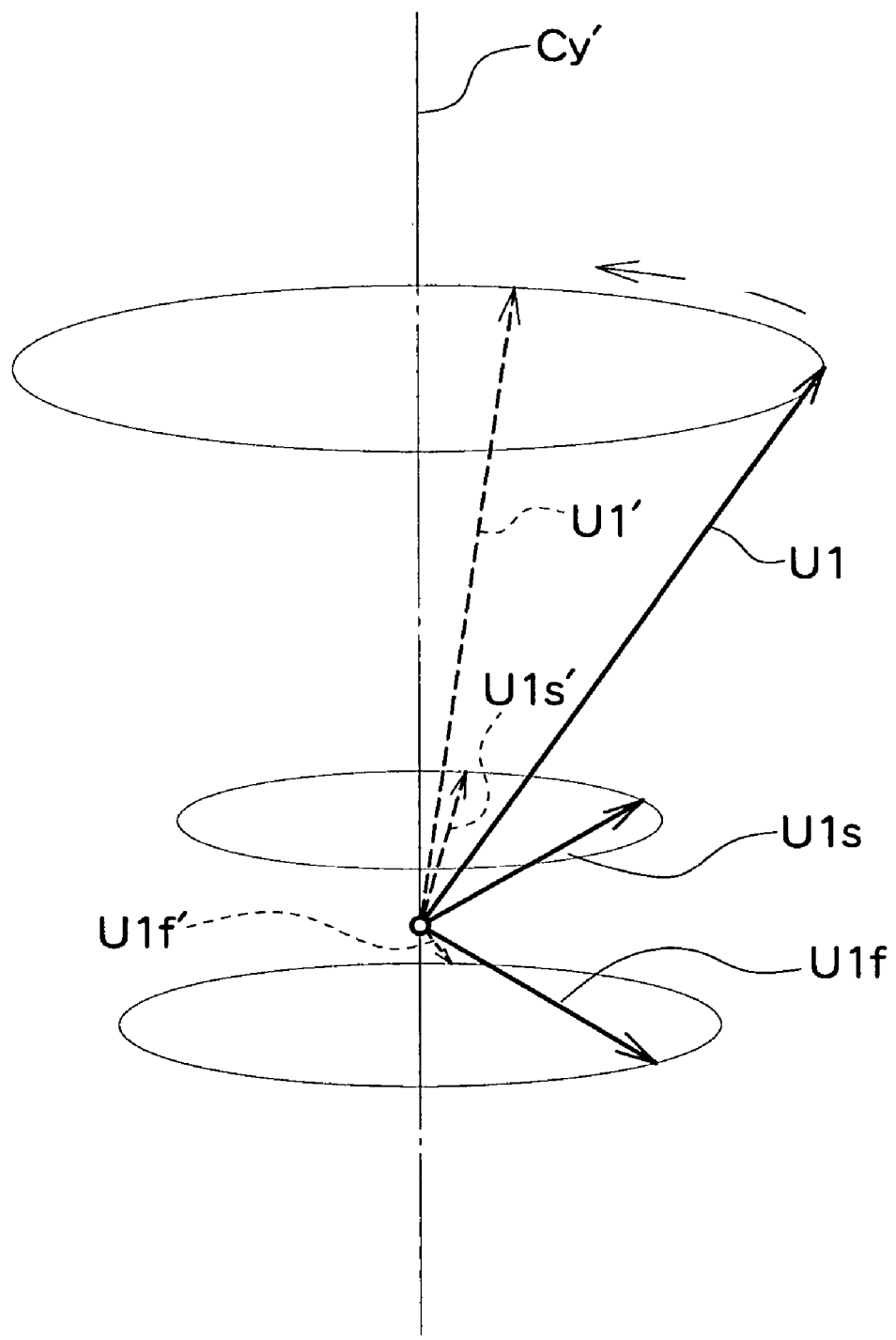
FIG. 7 is a diagram describing the left/right rotation of the bones.

FIG. 7 is a diagram showing a change in the bone U1 when the direction key 34 is operated in the left/right direction during attack in the alert mode. In FIG. 7, Cy' is a straight line that is parallel to a Y axis direction Cy in the character coordinate system 98 and passes through the starting point of the bone U1. U1' represents a state where the bone U1 has been changed as a result of operating the direction key 34 in the LEFT direction during attack in the alert mode. U1f' represents a state where the front direction vector U1f has been changed as a result of operating the direction key 34 in the LEFT direction during attack in the alert mode. U1s' represents a state where the side direction vector U1s has been changed as a result of operating the direction key 34 in the LEFT direction during attack in the alert mode.

As shown in FIG. 7, when the direction key 34 is operated in the LEFT direction during attack in the alert mode, the bone U1, the front direction vector U1f and the side direction vector U1s rotate counterclockwise, seen from above the straight line Cy', while the starting points of each remain fixed on the straight line Cy' and with the angles formed with the straight line Cy' remaining fixed. Namely, the end points of the bone U1, the front direction vector U1f and the side direction vector U1s rotate counterclockwise while maintaining a fixed distance from the straight line Cy'. When the direction key 34 is operated in the RIGHT direction, the end points of the bone U1, the front direction vector U1f and the side direction vector U1s rotate in the opposite direction. When the bone U1 turns in this manner, the bones U2, U3, U4, AR1, AR2, AR3, AR4, AL1, AL2, AL3, AL4 and M, which are dependent on the bone U1, also follow. Namely, the positional relationship between the bone U1 and the bones dependent on the bone U1 is maintained. As a result, the upper body shape is maintained in the character 100.

It will be noted that even when the direction key 34 is operated during attack in the alert mode, the bones H, LR1, LR2, LR3, LL1, LL2 and LL3 do not change. When the direction key 34 is operated in the left and right directions during attack in the alert mode by executing the above processing in the game device 10, the game character 100 turns their upper body left and right while keeping the lower half of their body stationary and swings the muzzle direction of the machine gun 101 left and right. In this manner, a state where the game character 100 shoots the machine gun 101 can be reproduced during attack.

Figure 8:
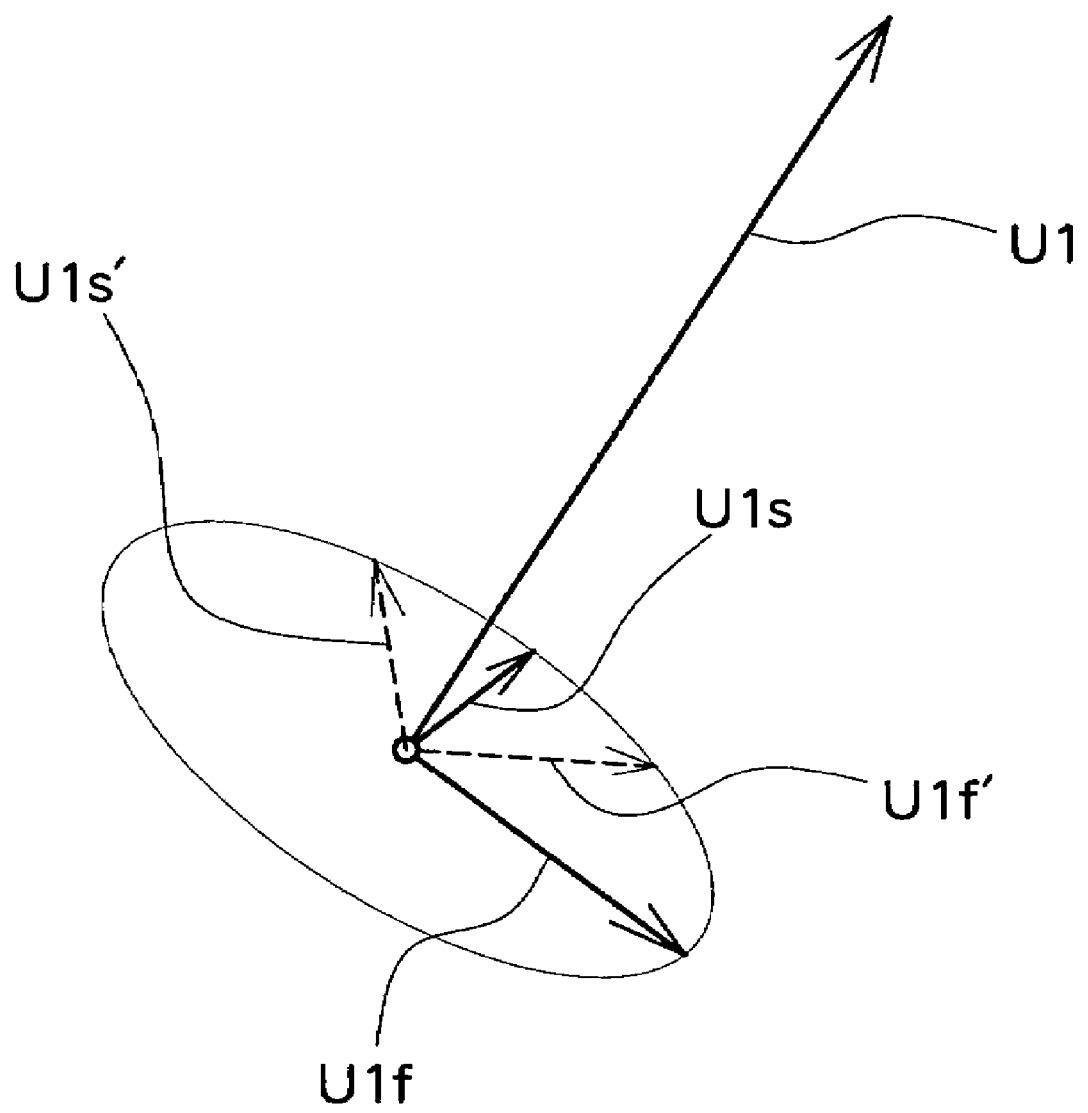
FIG. 8 is a diagram describing a modified example of the left/right rotation of the bones.

The manner of turning the upper body is not limited to the above. FIG. 8 is a diagram showing a modified example of the manner of changing the bone U1. As shown in FIG. 8, in this example, when the direction key 34 is operating in the left/right direction during attack in the alert mode, the front direction vector U1f and the side direction vector U1s rotate in the left/right direction using the bone U1 itself as an axis. In this case also, when the bone U1 turns, the bones dependent on the bone U1 also turn, and the positional relationship between the bone U1 and the dependent bones pertaining to the machine gun 101 and the like is maintained.

Figure 9:
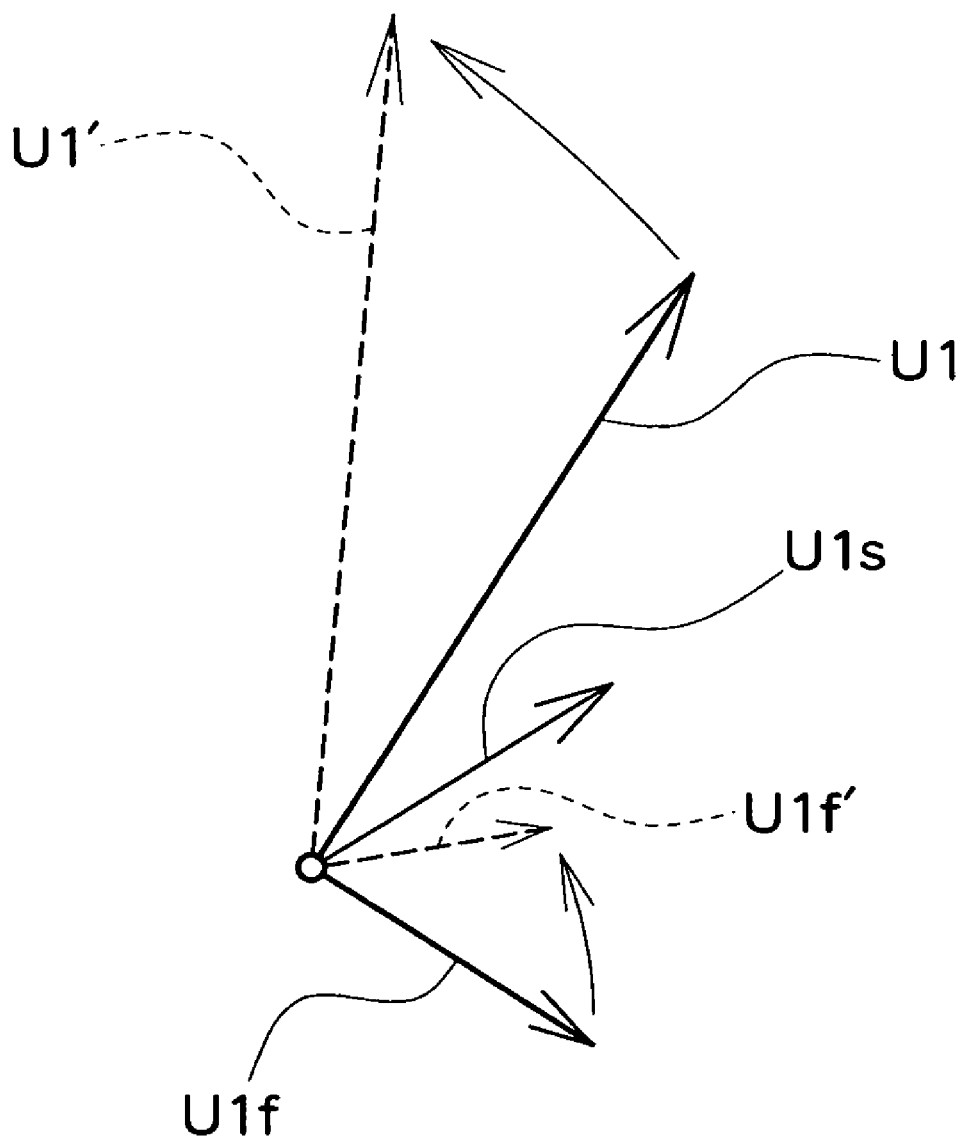
FIG. 9 is a diagram describing the up/down rotation of the bones.

Next, FIG. 9 is a diagram showing changes in the bone U1 when the direction key 34 is operated in the up/down direction during attack in the alert mode. As shown in FIG. 9, when the direction key 34 is operated in the UP direction, the front direction vector U1f rotates so as to face upward using the side direction vector U1s as an axis. When the direction key 34 is operated in the DOWN direction, the front direction vector U1f rotates so as to face downward using the side direction vector U1s as an axis. In this case also, when the bone U1 turns, the bones dependent on the bone U1 also turn, and the positional relationship between the bone U1 and the dependent bones pertaining to the machine gun 101 and the like is maintained.

Figure 10:
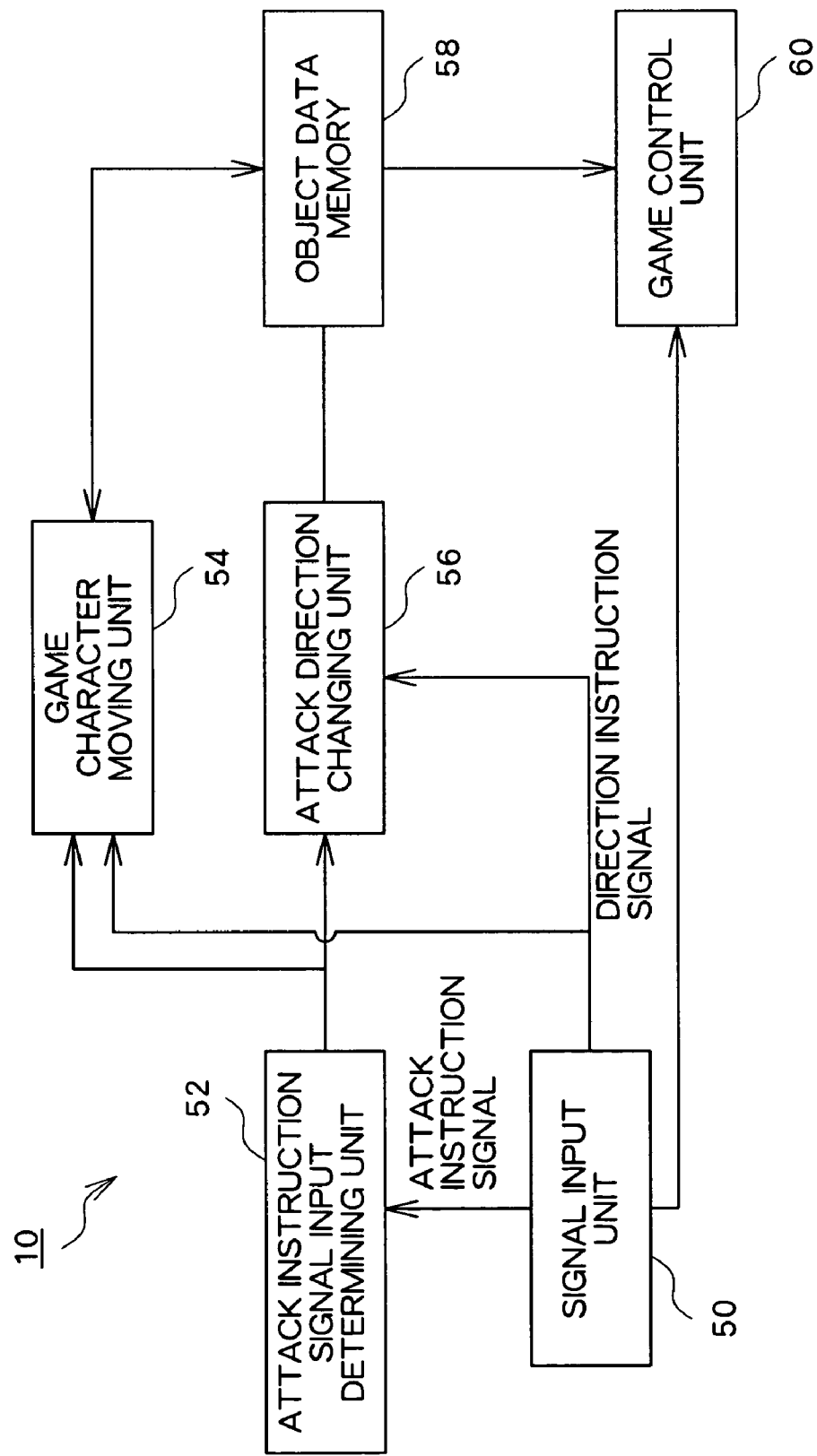
FIG. 10 is a diagram showing functional blocks of a game device pertaining to an embodiment of the invention.

FIG. 10 shows a functional block diagram of the game device 10 pertaining to the present embodiment. FIG. 10 shows, of the functions that the game device 10 pertaining to the present embodiment includes, mainly the functions relating to the present invention. As shown in FIG. 10, included among the functions that the game device 10 includes are a signal input unit 50, an attack instruction signal input determining unit 52, a game character moving unit 54, an attack direction changing unit 56, an object data memory 58 and a game control unit 60. These functions are realized by the home-use game device 46 executing a predetermined game program.

First, the signal input unit 50 includes the controller 48 and mainly inputs various operation signals for controlling the movement of the game character. In particular, the signal input unit 50 inputs an attack instruction signal in response to the depression of the button 38B. The signal input unit 50 also inputs a direction instruction signal—i.e., one of the UP direction signal, the DOWN direction signal, the RIGHT direction signal and the LEFT direction signal—in response to the operation of the direction key 34.

The object data memory 58 stores the positions, postures, shapes and designs of active objects, such as the game character 100 and the machine gun 101, and passive objects, such as buildings and floors. Particularly in regard to the game character 100 and the machine gun 101, the object data memory 58 stores the relative coordinates and postures (front direction vectors and side direction vectors) of the bones set in each part of the object as described above.

The attack instruction signal input determining unit 52 determines whether or not the attack instruction signal is inputted by the signal input unit 50. The game character moving unit 54 moves the game character in virtual space on the basis of the direction instruction signal inputted by the signal input unit 50 while the attack instruction signal is not being inputted by the signal input unit 50. Specifically, the object data memory 58 stores the position coordinates (position coordinates in the world coordinate system) in the virtual space of the character origin Co set in the game character, and the game character moving unit 54 updates the position coordinates on the basis of the direction instruction signal inputted by the signal input unit 50 while the attack instruction signal is being inputted by the signal input unit 50.

The attack direction changing unit 56 changes the attack direction resulting from the machine gun 101 on the basis of the direction instruction signal inputted by the signal input unit 50 while the attack instruction signal is being inputted by the signal input unit 50. At this time, the attack direction changing unit 56 changes the attack direction resulting from the machine gun 101 on the basis of the direction instruction signal inputted by the signal input unit 50 while restricting the movement of the game character 100 based on the direction instruction signal inputted by the signal input unit 50 while the attack instruction signal is being inputted by the signal input unit 50. Specifically, the attack direction changing unit 56 updates the data (positions and postures) pertaining to the bone U1 and the bones dependent on the bone U1 of the bones set in the game character 100 stored in the object data memory 58 on the basis of the direction instruction signal inputted by the signal input unit 50 while the attack instruction signal is being inputted by the signal input unit 50. Then, the attack direction changing unit 56 determines the posture of the machine gun 101, i.e., the attack direction, on the basis of the data pertaining to the bones and particularly the data pertaining to the bone U1.

The game control unit 60 bears the burden of other game control. In particular, when the button 38B is depressed, the game control unit 60 conducts processing for virtually firing bullets from the machine gun 101, determines whether or not another object has been hit by the virtual bullets, and when another object has been hit, executes staging in accordance with the hit.

Figure 11:
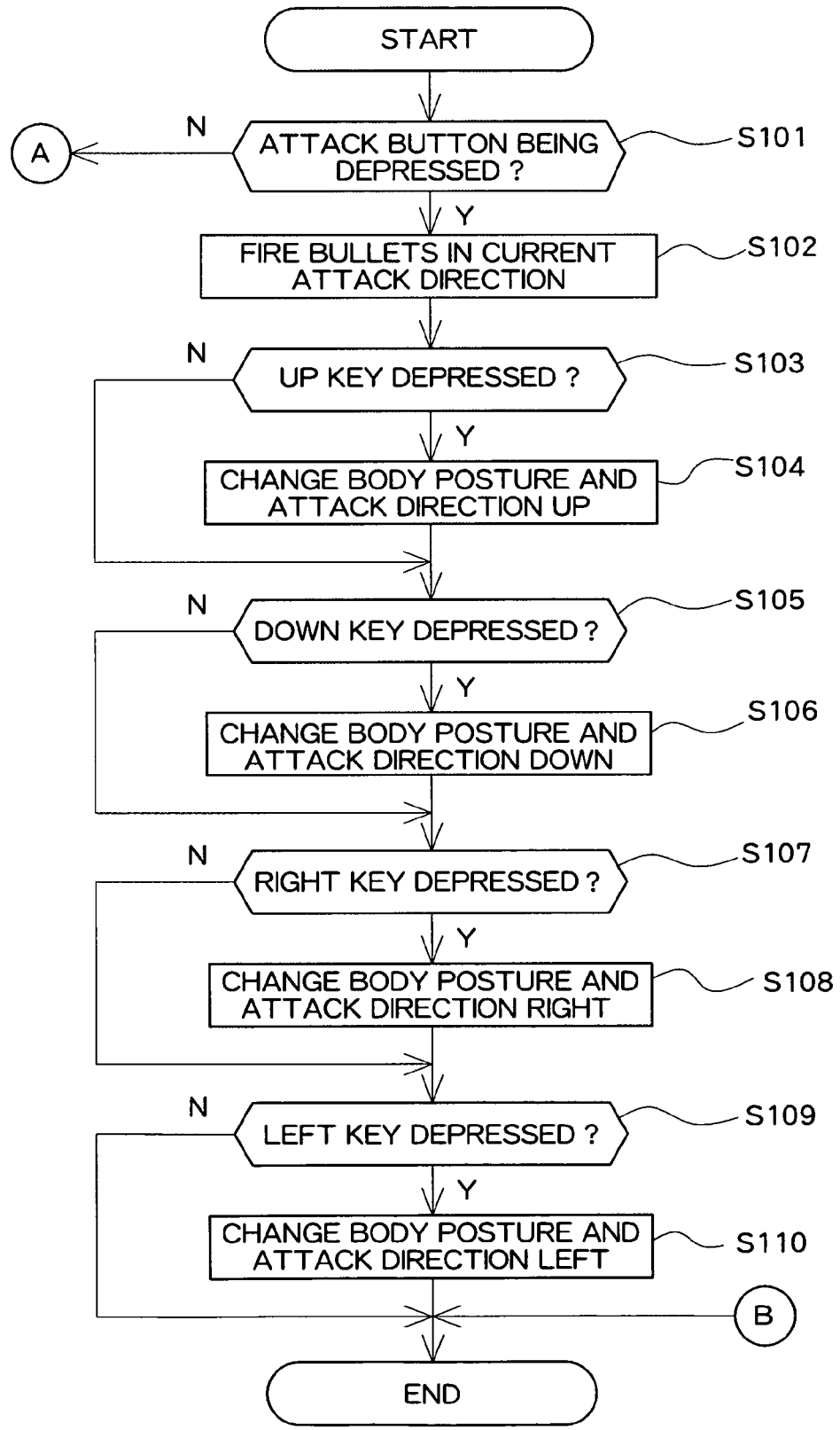
FIG. 11 is a flow chart showing alert mode processing.
Figure 12:
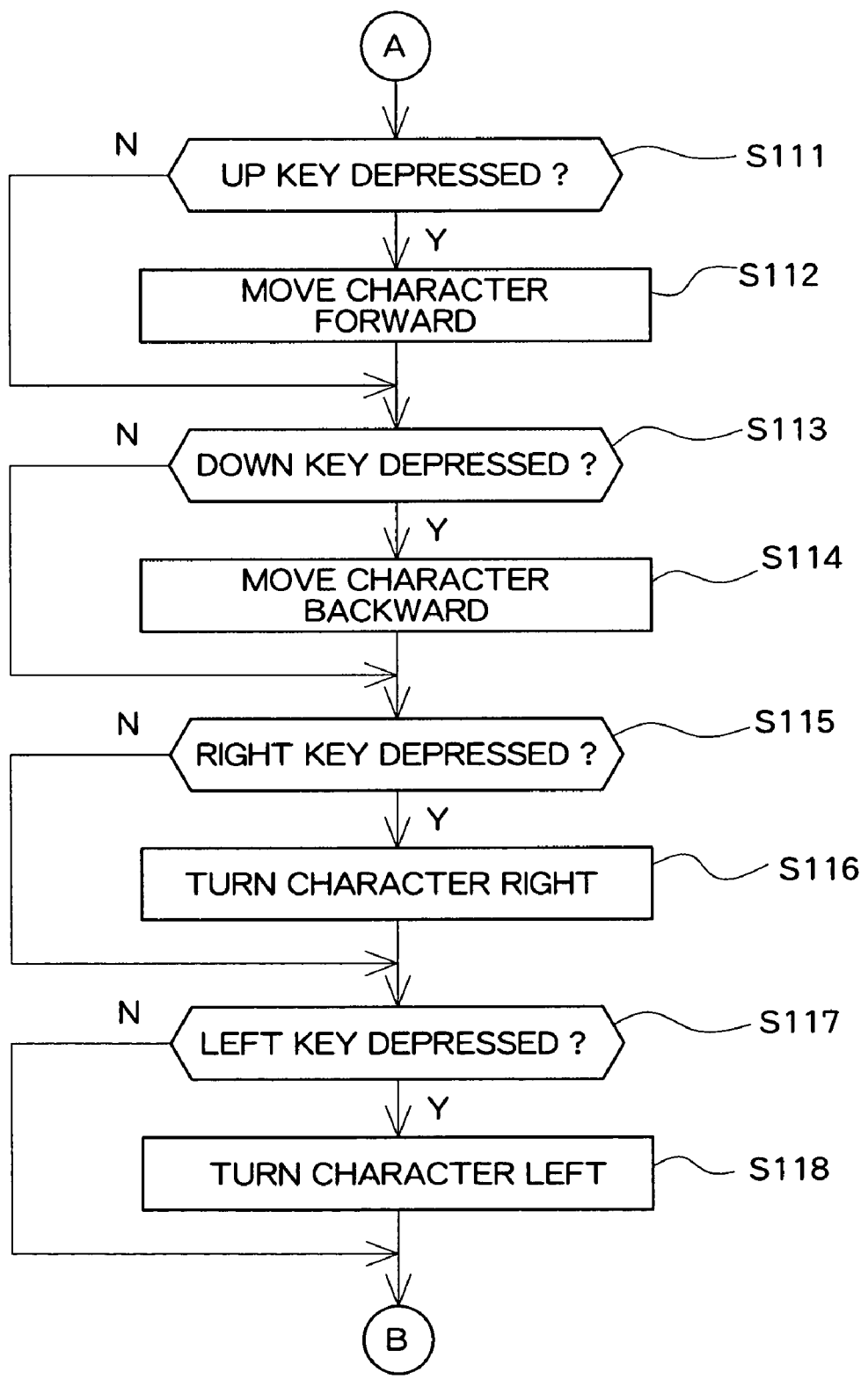
FIG. 12 is a flow chart showing alert mode processing.

FIGS. 11 and 12 are flow charts showing operation in alert mode. The processing shown in FIGS. 11 and 12 is processing that is repeated every predetermined amount of time during the alert mode setting. As shown in FIGS. 11 and 12, in alert mode, first the attack instruction signal input determining unit 52 determines whether or not the button 38B is being depressed (S101). Then, if the button 38B is being depressed, the game control unit 60 determines the bullet shooting direction (attack direction) on the basis of the current position and posture of the machine gun 101 stored in the object data memory 58 and executes processing for virtually firing the bullets (S102). Next, if the direction key 34 is operated in the UP direction (S103), the attack direction changing unit 56 moves the upper body of the game character 100 up and changes the posture of the machine gun 101 (S104) upward. If the direction key 34 is operated in the DOWN direction (S105), the attack direction changing unit 56 bends the upper body of the game character 100 down and changes the posture of the machine gun 101 (S106) downward. If the direction key 34 is operated in the RIGHT direction (S107), the attack direction changing unit 56 turns the upper body of the game character 100 right and changes the posture of the machine gun 101 rightward (S108). If the direction key 34 is operated in the LEFT direction (S109), the attack direction changing unit 56 turns the upper body of the game character 100 left and changes the posture of the machine gun 101 leftward (S110). Thereafter, this processing ends. After a predetermined amount of time, the processing is again executed if set to the alert mode.

When it is determined in S101 that the button 38B is not being depressed, the game character moving unit 54 moves the game character 100 forward (S112) if the direction key 34 is operated in the UP direction (S111). If the direction key 34 is operated in the DOWN direction (S113), the game character moving unit 54 moves the game character 100 back (S114). If the direction key 34 is operated in the RIGHT direction (S115), the game character moving unit 54 turns the game character 100 right using the right foot as an axis (S116). If the direction key 34 is operated in the LEFT direction (S117), the game character moving unit 54 turns the game character 100 left using the left foot as an axis (S118). Thereafter, this processing ends. After a predetermined amount of time, the processing is again executed if set to the alert mode.

According to the above-described game device 10, in the alert mode, the barrel direction of the machine gun 101 is changed by the direction key 34 while the button 38B is depressed and the attack instruction signal is being inputted. Also, the game character 160 can be moved by the direction key 34 while the button 38B is not being depressed. For this reason, both the moving direction and the attack direction can be easily instructed and inputted simply by the direction key 34.

It will be noted that the present invention is not limited to the above embodiment.

For example, in the above description, the machine gun 101 was used as the attack means which the game character 100 held, but all other existing or imaginary attack means can be used, such as pistols, laser guns that fire lasers, or hoses that spray water. Also, not only separate attack means, but part of the body of the game character itself may serve as attack means. Moreover, the invention can be applied not only to game characters imitating humans, but also game characters imitating moving bodies such as tanks, airplanes and spaceships.

Also, in the above description, the program was supplied from the DVD-ROM 25, which is an information storage medium, to the home-use game device 46, but the program may also be delivered to homes and the like via a communications network. FIG. 13 is a diagram showing the overall configuration of a program distributing system using a communications network. As shown in FIG. 13, a program distributing system 103 includes a game database 105, a server 104, a communications network 106, a personal computer 108, a home-use game device 110 and a PDA (portable information terminal) 112. Of these, a program distributing device 114 is configured by the game database 105 (information storage medium) and the server 104. The communications network 106 includes, for example, the Internet and cable television networks. In this system, the same program as that stored on the DVD-ROM 25 is stored in the game database 105. Consumers request distribution of the game using the personal computer 108, the home-use game device 110 or the PDA 112, and this request is then conveyed to the server 104 via the communications network 106. Next, the server 104 reads the program from the game database 105 in response to the game distribution request, and transmits the game to the game distribution requester, such as the personal computer 108, the home-use game device 110 or the PDA 112. Here, the program distribution method is configured so that the game is delivered in response to the game distribution request, but the program distribution method may also be configured so that the game is transmitted unilaterally from the server 104. Also, it is not invariably necessary for all programs necessary to realize the game to be delivered at once (all-at-once distribution (downloading)); the program distribution method may be configured so that the necessary portions are delivered in response to the stages of the game (partial distribution (streaming)). By configuring the game to be delivered in this manner via the communications network 106, consumers can easily acquire the program.

INDUSTRIAL APPLICABILITY

As described above, according to the present invention, it is possible to implement a game that can be applied to a game device and with which the moving direction and attack direction of a game character can be easily inputted.

The invention claimed is:

1. A game device executing game processing relating to a game character holding attack means, the game device comprising:

signal input means for inputting a direction instruction signal and an attack instruction signal;

attack instruction signal input determining means for determining whether or not the attack instruction signal is inputted by the signal input means;

game character moving means for moving the game character in real time in virtual space on the basis of the direction instruction signal inputted by the signal input means while the attack instruction signal is not being inputted by the signal input means; and attack direction changing means for changing an attack direction resulting from the attack means on the basis of the direction instruction signal inputted by the signal input means while the attack instruction signal is being inputted by the signal input means, the attack direction changing means being for changing the attack direction resulting from the attack means on the basis of the direction instruction signal inputted by the signal input means while restricting the movement of the game character based on the direction instruction signal inputted by the signal input means while the attack instruction signal is being inputted by the signal input means, and the attack direction changing means being for changing the posture of the game character and the attack means is also changed based on the direction instruction.

2. The game device of claim 1, further comprising parts data storage means for storage of plural parts data representing a posture and relative position from a given origin of each part of the game character, said parts data being defined within a game character coordinate system, and linkages related to the body structure of the character with respect to an origin in said character coordinate system are provided, and the attack direction changing means further comprising parts data partial updating means for updating part of the parts data stored in the parts data storage means on the basis of the direction instruction signal inputted by the signal input means while the attack instruction signal is being inputted by the signal input means, with the attack direction changing means determining the attack direction resulting from the attack means on the basis of the part of the parts data stored by the parts data storage means.

3. The game device of claim 1, the game character moving means further comprising character origin coordinate storage means for storing position coordinates in the virtual space of the character origin set in the game character, said game character being defined within said virtual space by linkages related to the body structure of the character with respect to said character origin, and the game character moving means being for updating the position coordinates stored in the character origin coordinate storage means on the basis of the direction instruction signal inputted by the signal input means while the attack instruction signal is being inputted by the signal input means.

4. The game device of claim 1, wherein the attack means continuously or intermittently attacks an attack target.

5. A game control method relating to a game character holding attack means, the game control method comprising:
   an attack instruction signal determining step for determining whether or not an attack instruction signal is inputted by signal input means;
   a game character moving step for moving the game character in real time in virtual space on the basis of a direction instruction signal inputted by the signal input means while the attack instruction signal is not being inputted by the signal input means; and
   an attack direction changing step for changing an attack direction resulting from the attack means on the basis of the direction instruction signal inputted by the signal input means while the attack instruction signal is being inputted by the signal input means,
   wherein the attack direction changing step being operative to change the attack direction resulting from the attack means on the basis of the direction instruction signal inputted by the signal input means while restricting the movement of the game character based on the direction instruction signal inputted by the signal input means while the attack instruction signal is being inputted by the signal input means, and
   the attack direction changing step being operative to change the posture of the game character and to change the attack means based on the direction instruction.

6. A computer program product comprising an information storage medium containing a program for causing a computer to function as a game device executing game processing relating to a game character holding attack means, the program causing the computer to function as:
   attack instruction signal input determining means for determining whether or not an attack instruction signal is inputted by signal input means;
   game character moving means for moving the game character in real time in virtual space on the basis of a direction instruction signal inputted by the signal input means while the attack instruction signal is not being inputted by the signal input means; and
   attack direction changing means for changing an attack direction resulting from the attack means on the basis of the direction instruction signal inputted by the signal input means while the attack instruction signal is being inputted by the signal input means,
   the attack direction changing means changes the attack direction resulting from the attack means on the basis of the direction instruction signal inputted by the signal input means while restricting the movement of the game character based on the direction instruction signal inputted by the signal input means while the attack instruction signal is being inputted by the signal input means, and
   the attack direction changing means being operative to change the posture of the game character and the attack means is also changed based on the direction instruction.

7. A program distributing device comprising: a computer program product comprising, an information storage medium as recited in claim 6, means for reading the program and means for delivering the program.

* * * * *